United States Patent
Epstein et al.

(10) Patent No.: US 12,430,389 B2
(45) Date of Patent: *Sep. 30, 2025

(54) COMPUTER IMPLEMENTED SYSTEM AND METHODS FOR IMPLEMENTING A SEARCH ENGINE ACCESS POINT

(71) Applicant: adMarketplace, New York, NY (US)

(72) Inventors: Adam J. Epstein, NY, NY (US); Michael Yudin, NY, NY (US); James Hill, NY, NY (US)

(73) Assignee: adMarketplace, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/419,791

(22) Filed: Jan. 23, 2024

(65) Prior Publication Data
US 2024/0160669 A1 May 16, 2024

Related U.S. Application Data

(63) Continuation of application No. 17/834,160, filed on Jun. 7, 2022, now Pat. No. 11,907,302, which is a continuation of application No. 16/871,321, filed on May 11, 2020, now Pat. No. 11,409,805.

(60) Provisional application No. 62/854,353, filed on May 30, 2019.

(51) Int. Cl.
| | |
|---|---|
| *G06F 17/00* | (2019.01) |
| *G06F 16/903* | (2019.01) |
| *G06F 16/9032* | (2019.01) |
| *G06F 16/909* | (2019.01) |
| *G06F 16/955* | (2019.01) |

(52) U.S. Cl.
CPC .. *G06F 16/90344* (2019.01); *G06F 16/90332* (2019.01); *G06F 16/909* (2019.01); *G06F 16/9566* (2019.01)

(58) Field of Classification Search
CPC ......... G06F 16/90344; G06F 16/90332; G06F 16/909; G06F 16/9566; G06F 16/9532
See application file for complete search history.

(56) References Cited

U.S. PATENT DOCUMENTS

| | | | |
|---|---|---|---|
| 9,922,344 B1* | 3/2018 | Christophe | G06Q 30/0256 |
| 11,409,805 B2* | 8/2022 | Epstein | G06F 16/909 |
| 11,907,302 B2* | 2/2024 | Epstein | G06F 16/9566 |
| 2012/0059821 A1* | 3/2012 | Li | G06F 40/232 707/723 |
| 2019/0138540 A1* | 5/2019 | Hu | G06F 16/90324 |

* cited by examiner

*Primary Examiner* — Greta L Robinson
(74) *Attorney, Agent, or Firm* — Widerman Malek, PL; Mark Malek; Jonathan Staudt

(57) ABSTRACT

A computer-implemented system and method to perform a search operation. The system may comprise a server that may include a matching unit and a database of keywords. The matching unit may receive a partial query term and may match the partial query term to the database of keywords to define a one or more matched keywords. The matching unit may perform a relevancy process on the matched keyword to determine one or more top matched keywords. The matching unit may send the top matched keyword and one or more respective elements, to be displayed adjacent the search access point. The top matched keyword and/or the respective element may include a selectable hyperlink to a landing location.

20 Claims, 9 Drawing Sheets

COMPUTER IMPLEMENTED SYSTEM AND METHODS FOR IMPLEMENTING A SEARCH ENGINE ACCESS POINT

RELATED APPLICATIONS

This application is a continuation application of and claims priority under 35 U.S.C. § 120 of U.S. patent application Ser. No. 17/834,160 filed on Jun. 7, 2022 and titled COMPUTER IMPLEMENTED SYSTEM AND METHODS FOR IMPLEMENTING A SEARCH ENGINE ACCESS POINT, which in turn is a continuation application of and claims priority under 35 U.S.C. § 120 of U.S. patent application Ser. No. 16/871,321, now U.S. Pat. No. 11,409,805, issued Aug. 9, 2022 filed on May 11, 2020 and titled COMPUTER IMPLEMENTED SYSTEM AND METHODS FOR IMPLEMENTING A SEARCH ENGINE ACCESS POINT ENHANCED FOR SUGGESTED LISTING NAVIGATION, which in turn claims priority under 35 U.S.C. § 119(e) of U.S. Provisional Patent Application Ser. No. 62/854,353 filed on May 30, 2019 and titled System and Methods for Implementing a Search Engine Access Point Enhanced for Suggested Listing Navigation. The contents of these applications are incorporated herein by reference except for where they conflict with the content herein.

FIELD OF THE INVENTION

The present invention relates to systems and methods for searching, presenting results and navigating to content on a network, i.e., the internet.

BACKGROUND OF THE INVENTION

The Internet is a global electronic marketplace of goods and services as well as of ideas and information. Pay for placement database search systems have been developed in which advertisers bid on the placement of their listings in search results returned to a searcher in response to a world wide web query from a searcher. Each advertiser's listing includes a search term and a bid amount. In some embodiments, each advertiser's listing includes a title, descriptive text and a clickable hyperlink or uniform resource locator (URL). The database of search listings stores many such listings, each associated with an advertiser. Upon receipt of the query, the database is searched and listings having a search term matching the query are formatted for display to the searcher as search results.

The advertisers adjust their bids or bid amounts to control the position at which their search listings are presented in the search results. The pay for placement system places search listings having higher-valued bids higher or closer to the top of the search listings. Other rules may be applied as well when positioning search listings.

For example, a more senior listing may be positioned or ranked higher than a junior listing for the same search term and same bid. Higher-ranked listings are seen by more searchers and are more likely to be clicked, producing traffic of potential customers to an advertiser's web site.

The searcher is presented with search listings based at least in part on the bid amounts. The search listings may extend over several screens or pages when formatted for viewing. As a result, higher positioned search listings are much more likely to be seen by the searcher. Moreover, some pay for placement systems have affiliate agreements whereby some of their highest-bid search listings are presented to searchers using search input boxes outside standard search engines. Because of these affiliate agreements and similar arrangements, an advertiser's web site, if bid highly enough, may today be seen by over seventy-five percent of Internet users.

An advertiser who wants to attract searchers to the web site as potential customers for the advertiser's goods and services thus has an incentive to position his search listing relatively high in the search results. An advertiser may enter bids on many search terms. For search terms which are closely related to the content of the advertiser's web site, the advertiser might place relatively large bids. For less closely related search terms, the advertiser might place smaller bids. Several strategies have been developed by advertisers to increase traffic to advertiser web sites in this manner.

As may be well known in this "search engine marketing" (SEM) industry, despite these systems' best efforts, attempting to match advertisements to search terms is inherently problematic when working within an unstructured environment like the Internet. Because search engines use, at least in part, impersonal algorithms, link analysis, and other automated methodologies to locate and present search, and advertising results, the delivery of irrelevant or minimally-relevant advertisements to the searcher is common. Indeed, attempting to discern a searcher's intent from the search terms they use is often characterized as being akin to trying to read their minds.

Thus, SEM and other traditional standards of advertising fail to provide maximized results to 10's of millions of businesses/advertisers, while further failing to deliver the up to 100's of valuable and useful, relevant, targeted product, service, and benefit opportunities and information to interested parties in a cost-effective manner. Internet advertising done right can offer a level of targetability, interactivity, measurability, and competitive privacy not generally available from other media.

Therefore, it would be desirable then to provide a system and method which would address the many shortcomings of the present conventional advertising standards including the ability to allow users to skip the search results page altogether and go directly to an advertiser's website.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the foregoing in mind, one of the many objects of the present invention is to provide a computer-implemented system to perform a search operation. The system may comprise a server in communication with a network. The server may include a matching unit and a database of keywords. The matching unit may receive a partial query term that may be inputted into a search access point, via the network. The matching unit may match the partial query term received to the database of keywords to define one or more matched keywords. The matching unit may also perform a relevancy process on the matched keyword to determine one or more top matched keywords. The matching unit may yet also send the top matched keyword and one or more respective elements associated with at least one of the top matched keywords, to be displayed adjacent the search access point. One or both of the top matched keyword and the respective element may include a selectable hyperlink to a landing location. The respective element may include one or more of an image, impression pixel, ad copy, ad term, product price, geographical indicator, click URL, image URL, impression URL, brand flag, brand domain, and a listing identifier.

In some embodiments of the present invention, the matching unit may perform the relevancy process by utilizing relevancy prediction information to define a matched keyword relevancy, and the matching unit may determine top matched keywords by utilizing the matched keyword relevancy. In some embodiments of the present invention, the matching unit may define the matched keyword relevancy as a relevancy score. The matching unit may perform the relevancy process on the matched keywords to define the relevancy score by utilizing the relevancy prediction information and by utilizing one or more of bids from relevant advertisers, geographic location of the remote computer, an inventory data list from at least one relevant advertiser, a desirability factor from at least one of the relevant advertisers to distance a desirable matched keyword from at least one undesirable matched keyword, and/or weights from a data list. In some embodiments, the matching unit may exclude matched keywords based upon a relatively low relevancy score.

In some embodiments of the present invention, the relevancy prediction information may comprise one or more of, user time of session, date of session, geographic location, device class, search frequency, historical performance, keyword match type, keyword class, publisher class, publisher ID, keyword ID, Adgroup ID, Adcopy ID, partial query length, partial query to keyword levenshtein distance, partial query to keyword Jaro similarity, organic ranking, publisher ID Click-Through Rate (CTR), publisher class CTR, keyword class CTR, keyword ID CTR, Adgroup ID CTR, Adcopy ID CTR, bid price, average order value (AOV), and/or conversion rate (CVR). In some embodiments of the present invention, the matching unit may change the top matched keywords and the at least one respective element based on a change to the partial query term.

In some embodiments of the present invention, the partial query term may include one or more of a document, a picture, an audio, a form of natural language, at least one word, and at least one character that is inputted into the search access point. In some embodiments, the search access point may be associated with a search engine for the Internet, and the search engine may be capable of identifying words on social media websites used by a user of the search access point to define social media keywords. The matching unit may perform the relevancy process on the matched keywords and the social media keywords to determine the one or more top matched keyword.

A method aspect of some embodiments of the present invention may be directed to a computer-implemented method to perform a search operation using a matching unit on a server in communication with a network. The method may include receiving a partial query term inputted into a search access point, via the network, and the method may include matching the partial query term to a database of keywords stored on the server to define one or more matched keywords. The method may further include performing a relevancy process on the matched keywords to determine one or more top matched keyword, and the method may include sending the top matched keywords and one or more respective elements that may be associated with at least one top matched keyword, to be displayed adjacent the search access point. The respective elements may include one or more of an image, impression pixel, ad copy, ad term, product price, geographical indicator, click URL, image URL, impression URL, brand flag, brand domain, and a listing identifier.

Some method aspects of embodiments of the present invention may include utilizing relevancy prediction information to define a matched keyword relevancy, and determining the at least one top matched keyword by utilizing the matched keyword relevancy. Method aspects of some embodiments may also include defining the matched keyword relevancy as a relevancy score, and performing the relevancy process may include defining the relevancy score by utilizing the relevancy prediction information and by utilizing at least one of bids from relevant advertisers, geographic location of the remote computer, an inventory data list from at least one relevant advertiser, a desirability factor from at least one of the relevant advertisers to distance a desirable matched keyword from at least one undesirable matched keyword, and weights from a data list.

Some method aspects of embodiments of the present invention may include excluding matched keywords based upon a relatively low relevancy score. The relevancy prediction information may comprise one or more of user time of session, date of session, geographic location, device class, search frequency, historical performance, keyword match type, keyword class, publisher class, publisher ID, keyword ID, Adgroup ID, Adcopy ID, partial query length, partial query to keyword levenshtein distance, partial query to keyword Jaro similarity, organic ranking, publisher ID Click-Through Rate (CTR), publisher class CTR, keyword class CTR, keyword ID CTR, Adgroup ID CTR, Adcopy ID CTR, bid price, average order value (AOV), and conversion rate (CVR).

Some method aspects of embodiments of the present invention may include changing the one or more of the top matched keywords and the respective elements based on a change to the partial query term. The partial query term may include one or more of a document, a picture, an audio, a form of natural language, at least one word, and at least one character that is inputted into the search access point. The search access point may be associated with a search engine for the Internet, and in some method aspects of embodiments of the present invention, the method may further comprise identifying words on social media websites used by a user of the search access point, with the search access point, to define social media keywords. Some method aspects may yet further include performing the relevancy process on the matched keywords and the social media keywords to determine the at least one top matched keyword.

Another object of the present invention may be to provide a matching unit for use in a computer-implemented system which may include a server in communication with a network and a database of keywords stored in the server. The matching unit may be configured to receive a partial query term inputted into a search access point associated with a search engine for the Internet, via the network. The search engine may be capable of identifying words on social media websites used by a user of the search access point to define social media keywords. The matching unit may also be configured to match the partial query term to the database of keywords to define one or more matched keyword, and the matching unit may be configured to perform a relevancy process on the matched keywords and the social media keywords to define a relevancy score. The matching unit may further be configured to determine one or more top matched keywords based on the matched keywords and the social media keywords by utilizing the relevancy score.

The matching unit may be configured to send the top matched keywords and one or more respective elements that may be associated with the one or more of the top matched keywords, to be displayed adjacent the search access point. The matching unit may also change one or more top matched keyword and respective element based on a change to the partial query term. The respective elements may include one or more of an image, impression pixel, ad copy, ad term, product price, geographical indicator, click URL, image URL, impression URL, brand flag, brand domain, and/or a listing identifier.

In some embodiments of the present invention, the relevancy process may be performed on the matched keywords to define the relevancy score based on relevancy prediction information. In some embodiments, the relevancy prediction information may include one or more of user time of session, date of session, geographic location, device class, search frequency, historical performance, keyword match type, keyword class, publisher class, publisher ID, keyword ID, Adgroup ID, Adcopy ID, partial query length, partial query to keyword levenshtein distance, partial query to keyword Jaro similarity, organic ranking, publisher ID Click-Through Rate (CTR), publisher class CTR, keyword class CTR, keyword ID CTR, Adgroup ID CTR, Adcopy ID CTR, bid price, average order value (AOV), and/or conversion rate (CVR).

In some embodiments of the present invention, the relevancy process may be performed on the matched keywords to define the relevancy score based on one or more of relevancy prediction information, a predefined keyword relevancy ranking, and a Key Performance Indicator (KPI). In some embodiments, the relevancy prediction information may include one or more of bids from relevant advertisers, geographic location of the remote computer, an inventory data list from at least one relevant advertiser, a desirability factor from at least one of the relevant advertisers to distance a desirable matched keyword from at least one undesirable matched keyword, and/or weights from a data list. In some embodiments of the present invention, the partial query term may include one or more of a document, a picture, an audio, a form of natural language, at least one word, and at least one character that is inputted into the search access point.

DETAILED DESCRIPTION OF THE INVENTION

Figure 1:
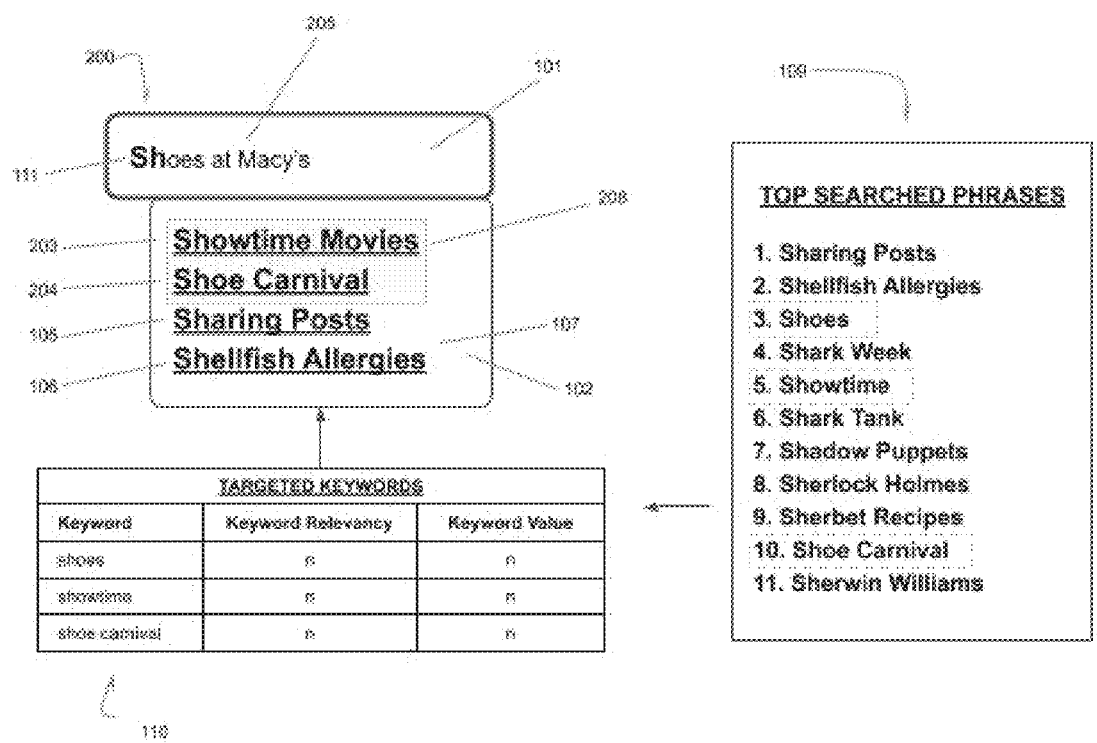
FIG. 1 is a schematic flow chart illustrating an embodiment of part of the invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the invention.

Before describing the present disclosure in detail, it is to be understood that this disclosure is not limited to parameters of the particularly exemplified systems, methods, apparatus, products, processes, and/or kits, which may, of course, vary. It is also to be understood that the terminology used herein is only for the purpose of describing particular embodiments of the present disclosure and is not necessarily intended to limit the scope of the disclosure in any particular manner. Thus, while the present disclosure will be described in detail with reference to specific embodiments, features, aspects, configurations, etc., the descriptions are illustrative and are not to be construed as limiting the scope of the claimed invention. Various modifications can be made to the illustrated embodiments, features, aspects, configurations, etc. without departing from the spirit and scope of the invention as defined by the claims. Thus, while various aspects and embodiments have been disclosed herein, other aspects and embodiments are contemplated.

Unless defined otherwise, all technical and scientific terms used herein have the same meaning as commonly understood by one of ordinary skill in the art to which the present disclosure pertains. While several methods and materials similar or equivalent to those described herein can be used in the practice of the present disclosure, only certain exemplary materials and methods are described herein.

Various aspects of the present disclosure, including devices, systems, methods, etc., may be illustrated with reference to one or more exemplary embodiments or implementations. As used herein, the terms "embodiment," "alternative embodiment" and/or "exemplary implementation" means "serving as an example, instance, or illustration," and should not necessarily be construed as preferred or advantageous over other embodiments or implementations disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

It will be noted that, as used in this specification and the appended claims, the singular forms "a," "an" and "the"

include plural referents unless the content clearly dictates otherwise. Thus, for example, reference to a "sensor" includes one, two, or more sensors.

As used throughout this application the words "can" and "may" are used in a permissive sense (i.e., meaning having the potential to), rather than the mandatory sense (i.e., meaning must). Additionally, the terms "including," "having," "involving," "containing," "characterized by," variants thereof (e.g., "includes," "has," and "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

Various aspects of the present disclosure can be illustrated by describing components that are coupled, attached, connected, and/or joined together. As used herein, the terms "coupled", "attached", "connected," and/or "joined" are used to indicate either a direct connection between two components or, where appropriate, an indirect connection to one another through intervening or intermediate components. In contrast, when a component is referred to as being "directly coupled", "directly attached", "directly connected," and/or "directly joined" to another component, no intervening elements are present or contemplated. Thus, as used herein, the terms "connection," "connected," and the like do not necessarily imply direct contact between the two or more elements. In addition, components that are coupled, attached, connected, and/or joined together are not necessarily (reversibly or permanently) secured to one another. For instance, coupling, attaching, connecting, and/or joining can comprise placing, positioning, and/or disposing the components together or otherwise adjacent in some implementations.

As used herein, directional and/or arbitrary terms, such as "top," "bottom," "front," "back," "left," "right," "up," "down," "upper," "lower," "inner," "outer," "internal," "external," "interior," "exterior," "proximal," "distal" and the like can be used solely to indicate relative directions and/or orientations and may not otherwise be intended to limit the scope of the disclosure, including the specification, invention, and/or claims.

Where possible, like numbering of elements have been used in various figures. In addition, similar elements and/or elements having similar functions may be designated by similar numbering. Furthermore, alternative configurations of a particular element may each include separate letters appended to the element number. Accordingly, an appended letter can be used to designate an alternative design, structure, function, implementation, and/or embodiment of an element or feature without an appended letter. Similarly, multiple instances of an element and or sub-elements of a parent element may each include separate letters appended to the element number. In each case, the element label may be used without an appended letter to generally refer to instances of the element or any one of the alternative elements. Element labels including an appended letter can be used to refer to a specific instance of the element or to distinguish or draw attention to multiple uses of the element. However, element labels including an appended letter are not meant to be limited to the specific and/or particular embodiment(s) in which they are illustrated. In other words, reference to a specific feature in relation to one embodiment should not be construed as being limited to applications only within said embodiment.

It will also be appreciated that where a range of values (e.g., less than, greater than, at least, and/or up to a certain value, and/or between two recited values) is disclosed or recited, any specific value or range of values falling within the disclosed range of values is likewise disclosed and contemplated herein.

It is also noted that systems, methods, apparatus, devices, products, processes, compositions, and/or kits, etc., according to certain embodiments of the present invention may include, incorporate, or otherwise comprise properties, features, aspects, steps, components, members, and/or elements described in other embodiments disclosed and/or described herein. Thus, reference to a specific feature, aspect, steps, component, member, element, etc. in relation to one embodiment should not be construed as being limited to applications only within said embodiment. In addition, reference to a specific benefit, advantage, problem, solution, method of use, etc. in relation to one embodiment should not be construed as being limited to applications only within said embodiment.

The headings used herein are for organizational purposes only and are not meant to be used to limit the scope of the description or the claims. To facilitate understanding, like reference numerals have been used, where possible, to designate like elements common to the figures.

Embodiments of the invention, as shown and described by the various figures and accompanying text, provides a search engine access point that is enhanced for suggested listings. The search engine access point may be empowered to match the input text to any list of relevant terms, and, from there, to match the relevant terms to targeted keywords using a computer implemented process that establishes each keyword's relevancy score based on historical performance and/or estimated/predefined values.

FIG. 1 illustrates features of an embodiment of the invention where the input text characters 111 may be compared against a list of targeted keywords 110 based on a computer implemented process that combines keyword relevancy with keyword value that, as an example, may be partially influenced by top searched phrases 109. While this embodiment displays the first three matched terms based on the targeted keyword match, any number of displayed matches are available depending on the search engine box 101 and the matched results text box 102. This embodiment illustrates the configuration possibilities of the embodiments.

Figure 2A:
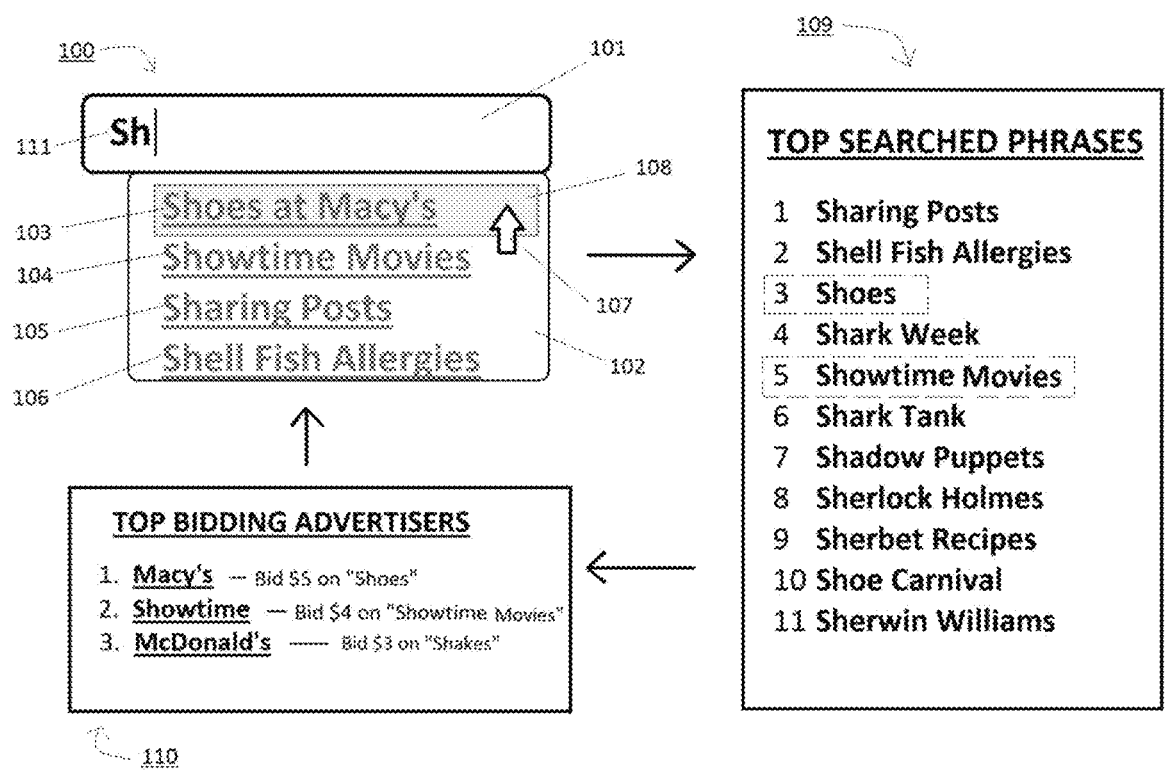
FIG. 2a is a schematic flow chart illustrating an embodiment of part of the invention.

FIG. 2a is a flow chart illustrating features of an embodiment of the invention whereby a search engine 100 may include a search box 101 structured to receive input text 111 typed by a user of the search engine 100. As illustrated, once a user begins typing, a matched keyword results box 102 may appear below the search box 101 with options for the user to input a selection into the search box 101 that is based on top matched keywords and matched keyword relevancy results of the current, incomplete/partial search term instead of typing a complete search term. As shown, a user may utilize their mouse pointer 107 to select a suggested result. Likewise, a user may simply hover over a suggested advertising result and press the enter button on their keyboard to select the hovered term as their operative input. Those skilled in the art will appreciate that arrow keys on a keyboard, or any other user input device, can also be used to select one of the suggested advertising results.

Also shown in the flow chart is a list of top searched phrases 109 and a list of top bidding advertisers 110. These lists are a visual representation of backend database examples and are not shown to the user. Each of these lists may be maintained in a single database or separate databases to be referenced and cross referenced by the search engine 100. By way of non-limiting example, FIG. 2*a* shows a user beginning to type input text characters 111 as "sh". Below the search box 101 the matched results text box 102 shows a list of matched terms as options for the user. The matched terms in the example are "Shoes at Macy's" 103, "Showtime Movies" 104, "Sharing Posts" 105 and "Shellfish Allergies" 106. The terms within this results text box 102 are a combination of both organically produced relevant search terms and process-matched, search terms.

The process-matched search terms are "Shoes at Macy's" 103 and "Showtime Movies" 104, for example. The organically produced relevant search terms are "Sharing Posts" 105 and "Shellfish Allergies" 106, for example.

In one embodiment, the search engine 100 computer implemented process may compare the input text 111 against the database of top searched phrases 109 to create a list of organically produced relevant search terms. Simultaneously, the input text 111 may be compared against a list of words that Top Bidding Advertisers 110 have bid on. If words/phrases that the Top Bidding Advertisers 110 bid on coincide with the list of organically produced relevant search terms, then the Top Bidding Advertisers 110 words are displayed at the top of the matched results text box 102. The organically produced relevant search terms are shown below them.

In the example shown in FIG. 2*a*, "Macys" was the top bidder at $5 for the term "Shoes". "Showtime" was the second highest bidder at $4 for the term "Showtime Movies" 104. Therefore, even though the database of top searched phrases 109 indicates that in an organic search "Sharing Posts" 105 would normally be at the top of the list and "Shellfish Allergies" 106 would be second, the search engine 100 computer implemented process places the highest and most relevant bidder, Macy's, in the first matched text position and the second highest bidder, Showtime, in the second matched text position. The top two organically produced search terms "Sharing Posts" 105 and "Shellfish Allergies" 106 are then placed, below the process-produced results, in the third and fourth position in the matched results text box 102. Since the term "Shakes" did not show up in the database of top searched phrases 109, McDonald's did not have a term appear within the suggested/predictive/auto-completing results text box 102, for example.

Figure 2B:
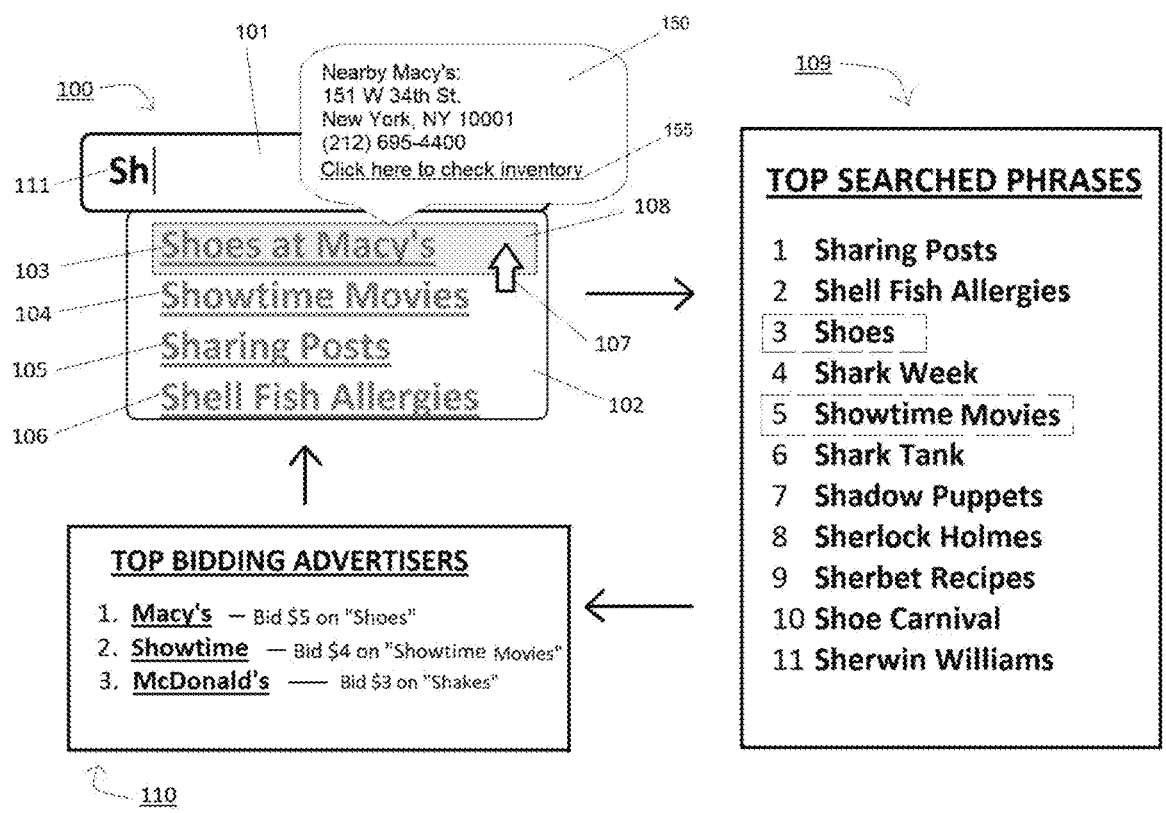
FIG. 2b is a schematic flow chart illustrating another embodiment of part of the invention.

FIG. 2*b* illustrates features of an embodiment where the IP address of a user may be used to identify a geographic location. That geographic location may be cross-referenced with the closest physical address associated with the top bidder. FIG. 2*b* is an example illustrating the geographic information within a pop-up 150 depicting top bidder "Macys" with a physical address of "151 W 34$^{th}$ St., New York, NY 10001, (212) 695-4400". There also may be an inventory link 155 to check inventory of the searched item. The inventory link 155 may be linked to a list of items the merchant would like associated with the search term. In some embodiments, these items may be stored in the search engine 100 database. In other embodiments, these items may be located on the merchant's own page. In some embodiments, a user may be able to place one of these items on hold for delivery or pickup, for example.

If the items associated with the inventory link 155 are on the search engine 100 database, then the search engine 100 may communicate a user's desire to order a particular item through an Application Program Interface (API).

Figure 3:
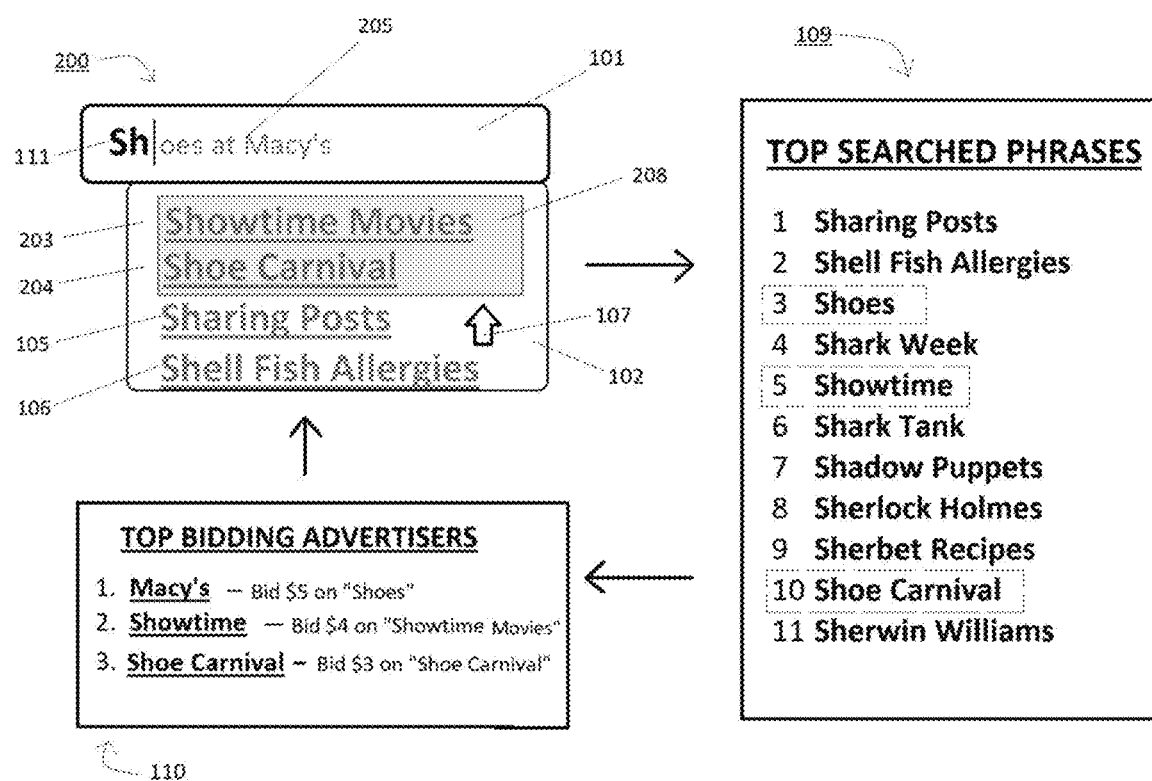
FIG. 3 is a schematic flow chart illustrating another embodiment of part of the invention.

FIG. 3 illustrates another embodiment whereby the highest bidding advertiser has its term placed inside the search box 101 in which the user is typing. In this embodiment, the user may only need to perform a single action (a mouse click or pressing a key on the keyboard, for example) to select the highest bid term. By way of non-limiting example, FIG. 3 illustrates that since Macy's was the highest bidder, the phrase "oes at Macy's" 205 appears as the top matched result within the search box 101 for the user when the input text 111 is "sh". Since Showtime was the second highest bidder at $4 on the phrase "Showtime Movies" 203 and Shoe Carnival was the second highest bidder at $3 with the phrase "Shoe Carnival" 204, those terms appear below the search box 101 in the matched results text box 102.

Since "Showtime Movies" 204 was the second highest bid term, it may be placed in the first position within the matched results text box 102. Likewise, since "Shoe Carnival" 204 was the third highest bid term, it may be placed in the second position within the matched results text box 102. In some embodiments the search engine 200 may highlight 208 the process-matched search terms within the first two positions of the matched results text box 102. This may distinguish those terms as conspicuous choices for the user. Likewise, the most relevant terms can be highlighted, which may also distinguish those terms as conspicuous choices for the user.

In some embodiments, a premium may be paid by the bidders to distance themselves from the competition (i.e., make their terms more "relevant" for matching purposes). By way of non-limiting example, top bidder Macy's in FIG. 3 could have placed a distance bid of $2 on a particular search term or stem. In this example, the matched result for the user's competition would be knocked down by at least one position if the competitor did not also place a distance bid themselves. In cases where more than one bidder placed a distance bid on a particular word, phrase, or stem, the top bidding distance bid combined with the top bidder for the search term may prevail.

In other embodiments, a user may have the ability to price shop between two different stores. In this embodiment, a retailer that may be closer in geographical location to the user may be able to price match a lower competitor within a certain geographical range, e.g. 10 miles.

In other embodiments, the search engine 100 may be enabled to crawl a user's social media to identify key words relevant to the user's search. In this embodiment, the search engine 100 may cross reference the key words found from the social media page with pre-bid terms. Terms that have the highest bid that correlate with a user's social media key words may be boosted in the search results.

Figure 4:
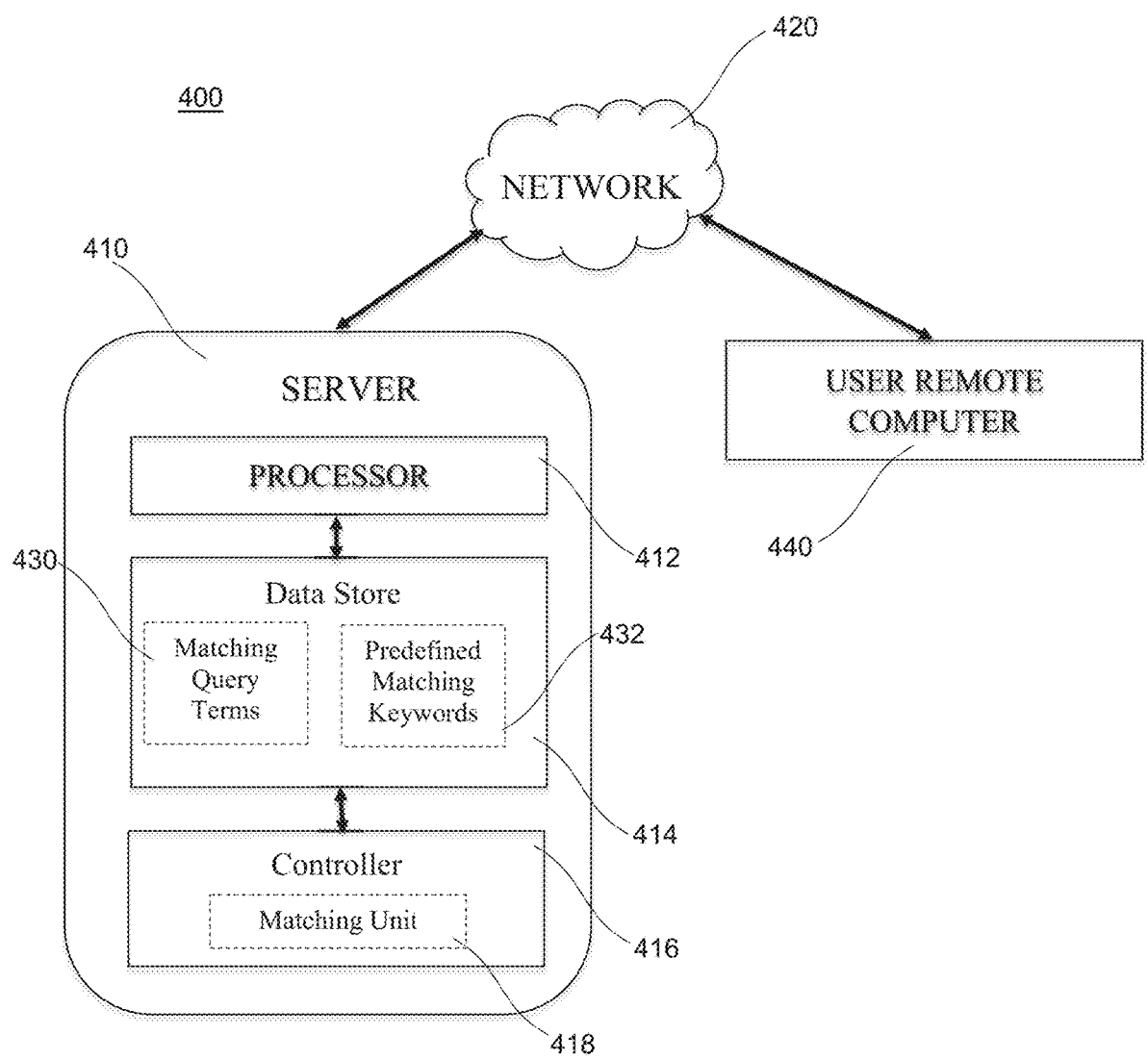
FIG. 4 is a schematic block diagram illustrating an embodiment of a computer-implemented system to perform a search operation in accordance with features of the present invention.
Figure 5:
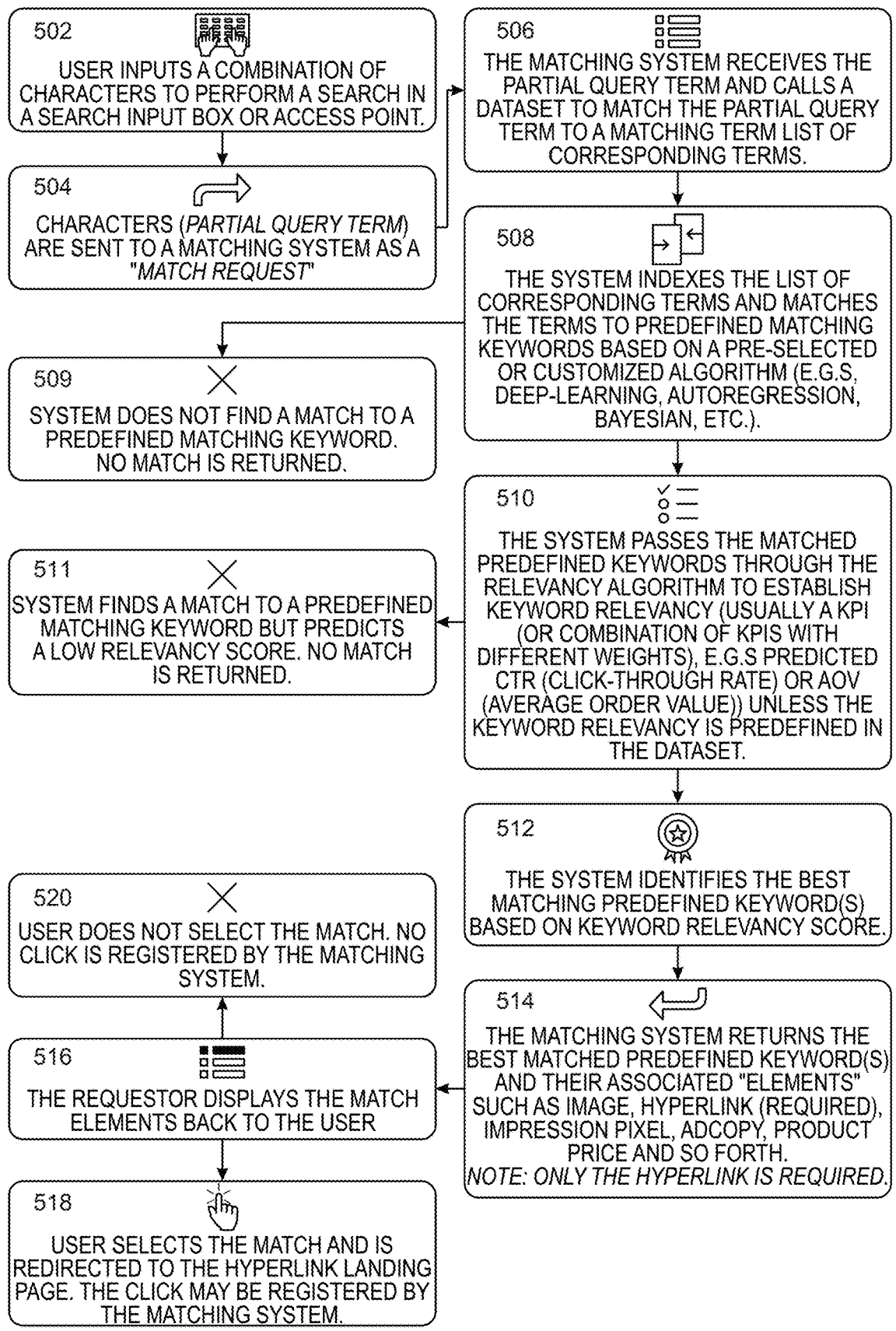
FIG. 5 is a flowchart illustrating the steps of a method to perform a computer-implemented search operation in accordance with features of the present invention.
Figure 6:
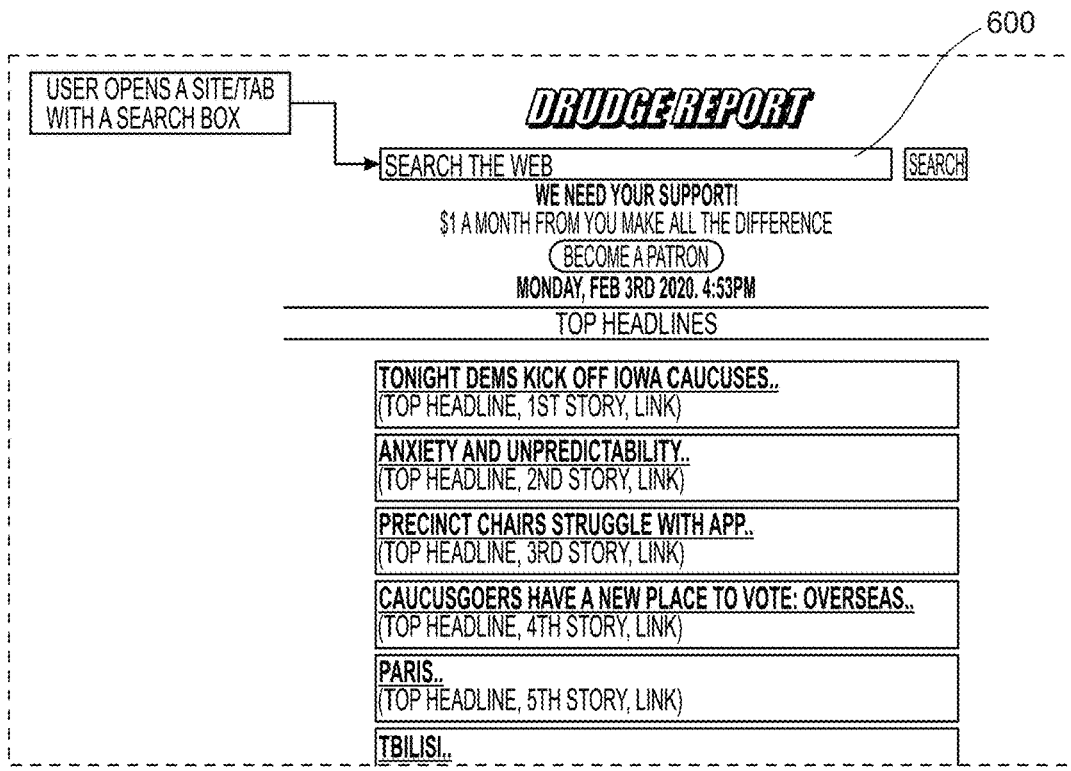
FIGS. 6-8 are example screenshots of a user interface illustrating features of the present embodiments.
Figure 7:
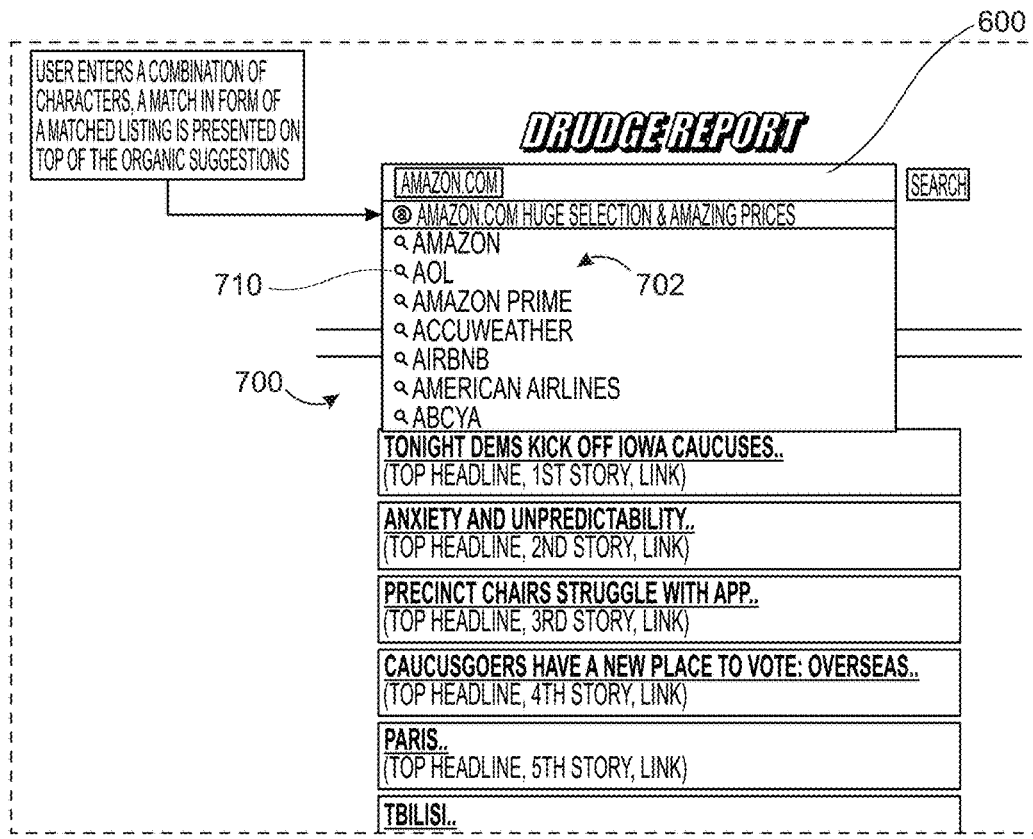
Figure 8:
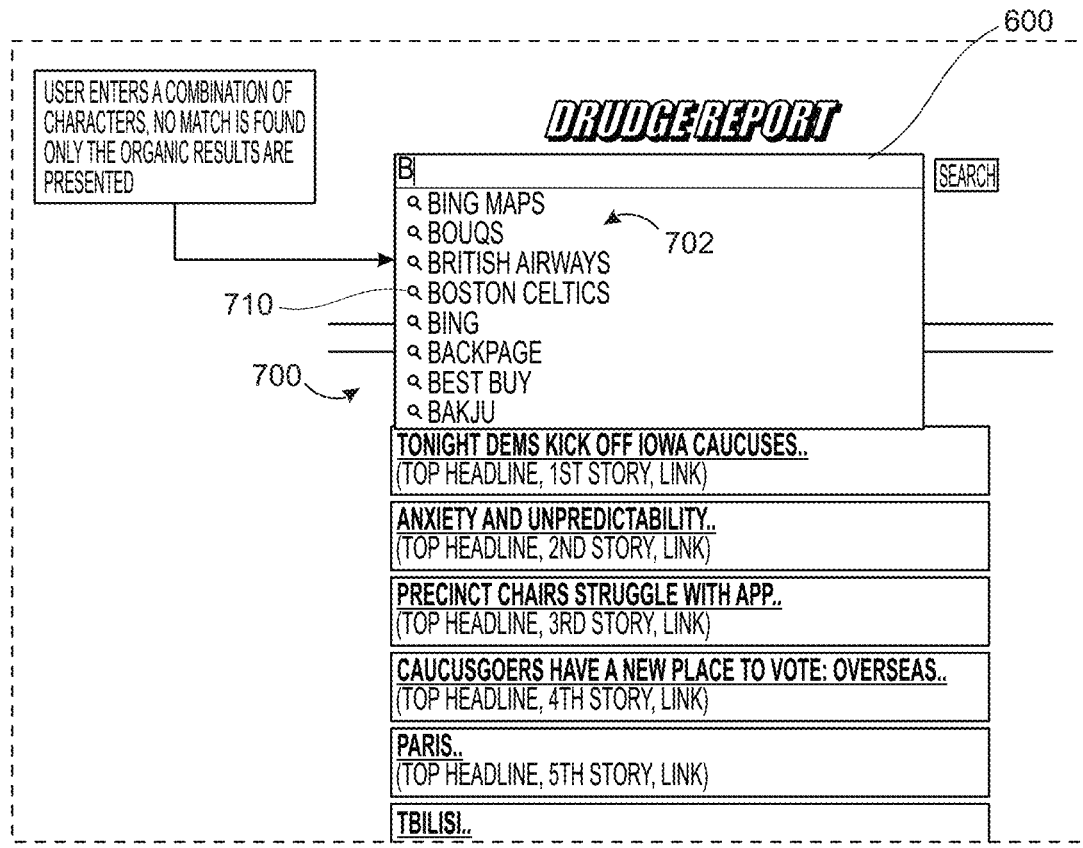

With reference to FIGS. 4-8, other embodiments of the present invention will be described. FIG. 4 is a schematic block diagram illustrating a computer-implemented system to perform a search operation in accordance with features of the present invention. FIG. 5 is a flowchart illustrating the example steps of a method to perform a computer-implemented search operation in accordance with features of the present invention. FIGS. 6-8 are example screenshots of a user interface illustrating features of the present embodiments.

A computer-implemented system 400 performs a search operation. A search engine is an information retrieval system designed to help find information stored on a computer system. The search results are usually presented in a list and are commonly called hits. Search engines help to minimize the time required to find information and the amount of information which must be consulted, akin to other techniques for managing information overload. The most public, visible form of a search engine is a Web search engine which searches for information on the World Wide Web (WWW).

Search engines provide an interface to a group of items that enables users to specify criteria about an item of interest and have the engine find the matching items. The criteria are referred to as a search query. In the case of text search engines, the search query is typically expressed as a set of words that identify the desired concept that one or more documents may contain. Some text search engines require users to enter two or three words separated by a space, other search engines may enable users to specify entire documents, pictures, sounds, and various forms of natural language. Some search engines apply improvements to search queries to increase the likelihood of providing a quality set of items through a process known as query expansion. Query understanding methods can be used as standardize query language.

The list of items that meet the criteria specified by the query is typically sorted or ranked. Ranking items by relevance (from highest to lowest) reduces the time required to find the desired information. Probabilistic search engines rank items based on measures of similarity (between each item and the query, typically on a scale of 1 to 0, 1 being most similar) and sometimes popularity or authority or use relevance feedback. Boolean search engines typically only return items which match exactly without regard to order.

To provide a set of matching items that are sorted according to some criteria quickly, a search engine will typically collect metadata about the group of items under consideration beforehand through a process referred to as indexing. The index typically requires a smaller amount of computer storage, which is why some search engines only store the indexed information and not the full content of each item, and instead provide a method of navigating to the items in the search engine result page. Alternatively, the search engine may store a copy of each item in a cache so that users can see the state of the item at the time it was indexed or for archive purposes or to make repetitive processes work more efficiently and quickly.

Other types of search engines do not store an index. Crawler, or spider type search engines (a.k.a. real-time search engines) may collect and assess items at the time of the search query, dynamically considering additional items based on the contents of a starting item (known as a seed, or seed URL in the case of an Internet crawler). Meta search engines store neither an index nor a cache and instead simply reuse the index or results of one or more other search engine to provide an aggregated, final set of results.

Desktop search tools search within a user's own computer files as opposed to searching the Internet. These tools are designed to find information on the user's PC, including web browser history, e-mail archives, text documents, sound files, images, and video. A variety of desktop search programs are available. Most desktop search programs are standalone applications. Desktop search products are software alternatives to the search software included in the operating system, helping users sift through desktop files, emails, attachments, and more.

Enterprise search is the practice of making content from multiple enterprise-type sources, such as databases and intranets, searchable to a defined audience. "Enterprise search" is used to describe the software of search information within an enterprise (though the search function and its results may still be public). Enterprise search can be contrasted with web search, which applies search technology to documents on the open web, and desktop search, which applies search technology to the content on a single computer. Enterprise search systems index data and documents from a variety of sources such as: file systems, intranets, document management systems, email, and databases. Enterprise search can be seen as a type of vertical search of an enterprise.

Search engine marketing (SEM) is a form of Internet marketing that involves the promotion of websites by increasing their visibility in search engine results pages (SERPs) primarily through paid advertising. SEM may incorporate search engine optimization (SEO), which adjusts or rewrites website content and site architecture to achieve a higher ranking in search engine results pages to enhance pay per click (PPC) listings. Search engine marketing is a way to create and edit a website so that search engines rank it higher than other pages. It may be also focused on keyword marketing or pay-per-click advertising (PPC). The technology enables advertisers to bid on specific keywords or phrases and ensures ads appear with the results of search engines.

With the development of this system, the price is growing under a high level of competition. Many advertisers prefer to expand their activities, including increasing search engine results and adding more keywords. The more advertisers are willing to pay for clicks, the higher the ranking for advertising, which leads to higher traffic. PPC comes at a cost. The higher position is likely to cost $5 for a given keyword, and $4.50 for a third location. A third advertiser may earn 10% less than the top advertiser while reducing traffic by 50%, for example.

The system 400 includes at least one server 410, coupled in communication with a network 420. The system includes a processor 412, a data store 414, and a controller 416 having a matching unit 418. The matching unit 418 is configured to access data included in the data store 414, the data store defining a database 430 of matching query terms and a database 432 of predefined matching keywords. The matching unit 418 is configured to receive a partial query term entered into a displayed search access point 600 (e.g., FIG. 6) at a remote computer 440 connected in communication with the network 420, each partial query term comprising at least one character that is input into the search access point 600 via a user input device of the remote computer 440.

The matching unit 418 is configured to match the partial query term to the database 430 of matching query terms to create a list of corresponding matching terms. The matching unit 418 is configured to match the corresponding matching query terms to the database 432 of predefined matching keywords to define matched keywords. The matching unit 418 is further configured to perform a relevancy process on the matched keywords to define a matched keyword relevancy, and then determine top matched keywords based upon the matched keyword relevancy. The matching unit 418 is configured to send a listing 702, that at least includes respective elements associated with the top matched keywords, to be displayed in a matched keyword results zone 700, adjacent the displayed search access point 600, at the remote computer 440. The respective associated elements of each listing 702 at least include a hyperlink 710 to a landing location, and the hyperlinks are selectable at the remote computer 440 via the user input device.

The displayed search access point 600 may be associated with a search engine for the Internet and/or a search appliance for a database.

The matching unit 418 may be configured to index the list of corresponding matching query terms to match the corresponding matching query terms to the database 432 of predefined matching keywords. The matching unit 418 may be further configured to perform the relevancy process on the matched keywords to define the matched keyword relevancy using a predefined keyword relevancy ranking, and then determine the top matching keywords based upon the matched keyword relevancy. The matching unit 418 may be further configured to perform the relevancy process on the matched keywords to define the matched keyword relevancy using a Key Performance Indicator (KPI), and then determine the top matching keywords based upon the matched keyword relevancy.

The matching unit 418 may be further configured to perform the relevancy process on the matched keywords to define the matched keyword relevancy using relevancy prediction information, and then determine the top matching keywords based thereon; wherein the relevancy prediction information comprises at least one of time of session, date of session, geo location, keyword match type, keyword class, publisher class, publisher ID, keyword ID, Adgroup ID, Adcopy ID, partial query length, partial query to keyword levenshtein distance, partial query to keyword Jaro similarity, organic ranking, publisher ID Click-Through Rate (CTR), publisher class CTR, keyword class CTR, keyword ID CTR,_Adgroup ID CTR, Adcopy ID CTR, bid price, user device class, search frequency, historical performance, average order value (AOV), and conversion rate (CVR).

The matching unit 418 may perform the relevancy process on the matched keywords to define the matched keyword relevancy as a relevancy score, or exclude matched keywords based upon a relatively low relevancy score. The relevancy score may be defined by bids from relevant advertisers. The relevancy score may be predefined by weights from a data list. The relevancy score may be further defined based upon a geographic location of the remote computer 440. The relevancy score may be further defined based upon an inventory data list from at least one relevant advertiser. The relevancy score may be defined based upon a desirability factor from at least one of the relevant advertisers to distance a desirable matched keyword from at least one undesirable matched keyword.

The associated elements may also include at least one of an ad term, product price, geographical indicator, click URL, image URL, impression URL, brand flag, brand domain and a listing identifier.

With additional reference to FIG. 5, the computer-implemented method performs a search operation as discussed above using the server 410, coupled in communication with the remote computer 440 over the network 420. The method includes storing a database 430 of matching query terms and a database 432 of predefined matching keywords in the data store 414 accessible by the matching unit 418. A user inputs 502 one or more characters in a displayed search access point 600 to perform a search, and the characters are sent 504 to the matching unit 418. The matching unit 418 receives 506 a partial query term entered 502 into the displayed search access point 600 at the remote computer 440 connected in communication via the network 420. Again, each partial query term includes at least one character that is input into the search access point 600.

The method includes matching 508, at the matching unit 418, the partial query term to the database 430 of matching query terms to create a list of corresponding matching terms, and matching, at the matching unit 418, the corresponding matching terms to the database 432 of predefined matching keywords to define matched keywords. If no matches are found, then no match is returned 509. The method 500 includes performing 510, at the matching unit 418, a relevancy process on the matched keywords to define a matched keyword relevancy, and then determine 512 top matched keywords based upon the matched keyword relevancy. If the relevancy is too low (e.g., below a threshold), no match is returned 511.

The method 500 includes sending 514, from the matching unit 418, a listing 702, that at least includes respective elements associated with the top matched keywords, to be displayed 516 in a matched keyword results zone 700, adjacent the displayed search access point 600, at the remote computer 440. The respective associated elements of the listing 702 at least include a hyperlink 710 to a landing location, and the hyperlinks are selectable at the remote computer 440 via the user input device. A user may select 518 a match and is redirected to the hyperlink landing page, for example, while the click is registered by the matching unit 418. Or, the user does not select 520 a match and no click is registered.

The matching unit 418 preferably indexes the list of corresponding matching query terms to match the corresponding matching query terms to the database 432 of predefined matching keywords. The matching unit 418 may perform the relevancy process on the matched keywords to define the matched keyword relevancy using a predefined keyword relevancy ranking, and then determines the top matched keywords based upon the matched keyword relevancy (e.g. at block 510). The matching unit 418 performs the relevancy process on the matched keywords to define the matched keyword relevancy using a Key Performance Indicator (KPI), and then determines the top matched keywords based upon the matched keyword relevancy.

The matching unit 418 may perform the relevancy process on the matched keywords to define the matched keyword relevancy using relevancy prediction information, and then determines the top matching keywords based thereon. The relevancy prediction information may include at least one of time of session, date of session, geo location, keyword match type, keyword class, publisher class, publisher ID, keyword ID, Adgroup ID, Adcopy ID, partial query length, partial query to keyword levenshtein distance, partial query to keyword Jaro similarity, organic ranking, publisher ID Click-Through Rate (CTR), publisher class CTR, keyword class CTR, keyword ID CTR, Adgroup ID CTR, Adcopy ID CTR, bid price, user device class, search frequency, historical performance, average order value (AOV), and conversion rate (CVR).

The matching unit 418 may perform the relevancy process on the matched keywords to define the matched keyword relevancy as a relevancy score 510.

As discussed above, the matching unit 418 may exclude matched keywords based upon a relatively low relevancy score. The relevancy score may be defined by bids from relevant advertisers. The relevancy score may be predefined by weights from a data list. The relevancy score may be further defined based upon a geographic location of the remote computer 440. The relevancy score may be further defined based upon an inventory data list from at least one relevant advertiser. The relevancy score may be further defined based upon a desirability factor from at least one of the relevant advertisers to distance a desirable matched keyword from at least one undesirable matched keyword.

Again, the respective associated elements may also include at least one of ad term, product price, geographical indicator, click URL, image URL, impression URL, brand flag, brand domain and a listing identifier.

Figure 9:
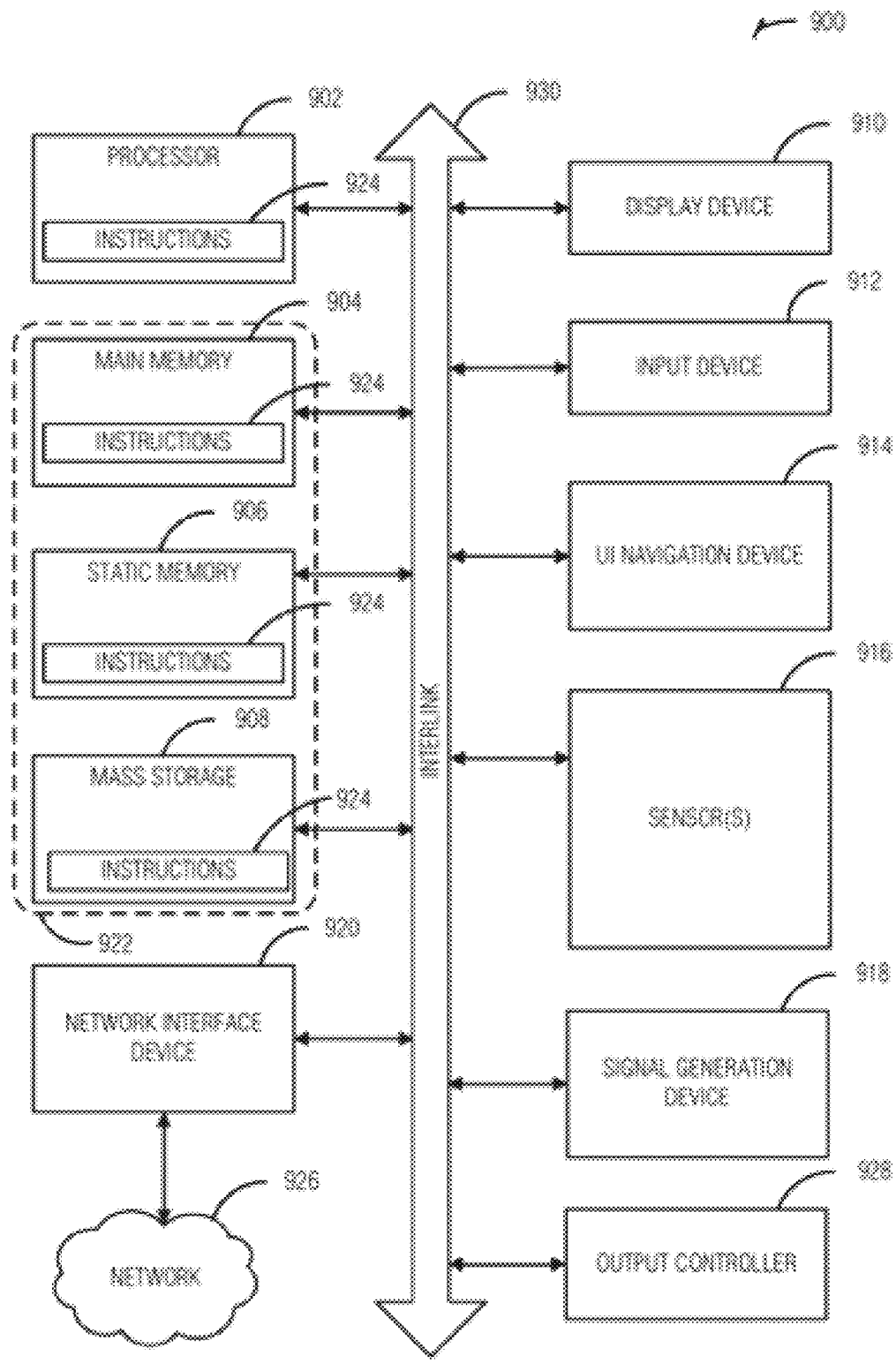
FIG. 9 is a block diagram illustrates an example machine or computer upon which any one or more of features and/or methods discussed herein may perform.

FIG. 9 illustrates a block diagram of an example machine 900 upon which any one or more of the techniques (e.g., methods) discussed herein may perform. Examples, as described herein, may include, or may operate by, logic or several components, or mechanisms in the machine 900. Circuitry (e.g., processing circuitry) is a collection of circuits implemented in tangible entities of the machine 900 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 900 follow.

In alternative embodiments, the machine 900 may operate as a standalone device or may be connected (e.g., wired or wirelessly networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 900 may include a hardware processor 902 (e.g., a central processing unit (CPU), a graphics processing unit (GPU), a hardware processor core, or any combination thereof), a main memory 904, a static memory (e.g., memory or storage for firmware, microcode, a basic-input-output (BIOS), unified extensible firmware interface (UEFI), etc.) 906, and mass storage 908 (e.g., hard drive, tape drive, flash storage, or other block devices) some or all of which may communicate with each other via an interlink (e.g., bus) 930. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 908, a signal generation device 918 (e.g., a speaker), a network interface device 920, and one or more sensors 916, such as a global positioning system (GPS) sensor, compass, accelerometer, or another sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 902, the main memory 904, the static memory 906, or the mass storage 908 may be, or include, a machine readable medium 922 on which is stored one or more sets of data structures or instructions 924 (e.g., software) embodying or utilized by any one or more of the techniques or functions described herein. The instructions 924 may also reside, completely or at least partially, within any of registers of the processor 902, the main memory 904, the static memory 906, or the mass storage 908 during execution thereof by the machine 900. In an example, one or any combination of the hardware processor 902, the main memory 904, the static memory 906, or the mass storage 908 may constitute the machine-readable media 922. While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine-readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may be further transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software. A transmission medium is a machine readable medium.

The components may be implemented by one or more processors or computers. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

As may also be used herein, the terms "processor", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The above description provides specific details, such as material types and processing conditions to provide a thorough description of example embodiments. However, a person of ordinary skill in the art would understand that the embodiments may be practiced without using these specific details.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced items. Thus, the scope of the invention should be determined by the appended claims and their legal equivalents, and not by the examples given.

What is claimed is:

1. A computer-implemented system to perform a search operation, the system comprising:
    a server in communication with a network, the server comprising a matching unit; and
    a database of keywords stored in the server;
    wherein the matching unit:
        receives a partial query term inputted into a search access point, via the network;
        matches the partial query term to the database of keywords to define at least one matched keyword;
        performs a relevancy process on the at least one matched keyword to determine at least one top matched keyword; and
        sends the at least one top matched keyword and at least one respective element associated with the at least one top matched keyword, to be displayed adjacent the search access point;
    wherein at least one of the at least one top matched keyword and the at least one respective element includes a selectable hyperlink to a landing location; and
    wherein the at least one respective element includes at least one of an image, impression pixel, ad copy, ad term, product price, geographical indicator, click URL, image URL, impression URL, brand flag, brand domain, and a listing identifier.

2. The computer-implemented system according to claim 1, wherein the matching unit is further configured to perform the relevancy process by utilizing relevancy prediction information to define a matched keyword relevancy; and wherein the matching unit is configured to determine the at least one top matched keyword by utilizing the matched keyword relevancy.

3. The computer-implemented system according to claim 2, wherein the matching unit defines the matched keyword relevancy as a relevancy score; and wherein the matching unit is further configured to perform the relevancy process on the at least one matched keyword to define the relevancy score by utilizing the relevancy prediction information and by utilizing at least one of bids from relevant advertisers, geographic location of the remote computer, an inventory data list from at least one relevant advertiser, a desirability factor from at least one of the relevant advertisers to distance a desirable matched keyword from at least one undesirable matched keyword, and weights from a data list.

4. The computer-implemented system according to claim 3, wherein the matching unit is configured to exclude matched keywords based upon a relatively low relevancy score.

5. The computer-implemented system according to claim 2, wherein the relevancy prediction information comprises at least one of user time of session, date of session, geographic location, device class, search frequency, historical performance, keyword match type, keyword class, publisher class, publisher ID, keyword ID, Adgroup ID, Adcopy ID, partial query length, partial query to keyword levenshtein distance, partial query to keyword Jaro similarity, organic ranking, publisher ID Click-Through Rate (CTR), publisher class CTR, keyword class CTR, keyword ID CTR, Adgroup ID CTR, Adcopy ID CTR, bid price, average order value (AOV), and conversion rate (CVR).

6. The computer-implemented system according to claim 1, wherein the matching unit changes the at least one top matched keyword and the at least one respective element based on a change to the partial query term.

7. The computer-implemented system according to claim 1, wherein the partial query term includes at least one of a document, a picture, an audio, a form of natural language, at least one word, and at least one character that is inputted into the search access point.

8. The computer-implemented system according to claim 1, wherein the search access point is associated with a search engine for the Internet; wherein the search engine is capable of identifying words on social media websites used by a user of the search access point to define social media keywords; and wherein the matching unit is further configured to perform the relevancy process on the at least one matched keyword and the social media keywords to determine the at least one top matched keyword.

9. A computer-implemented method to perform a search operation using a matching unit on a server in communication with a network, the method comprising:
    receiving a partial query term inputted into a search access point, via the network;
    matching the partial query term to a database of keywords stored on the server to define at least one matched keyword;
    performing a relevancy process on the at least one matched keyword to determine at least one top matched keyword; and
    sending the at least one top matched keyword and at least one respective element associated with the at least one top matched keyword, to be displayed adjacent the search access point;
    wherein the at least one respective element includes at least one of an image, impression pixel, ad copy, ad term, product price, geographical indicator, click URL, image URL, impression URL, brand flag, brand domain, and a listing identifier.

10. The computer-implemented method according to claim 9, further comprising utilizing relevancy prediction information to define a matched keyword relevancy; and determining the at least one top matched keyword by utilizing the matched keyword relevancy.

11. The computer-implemented method according to claim 10, further comprising defining the matched keyword relevancy as a relevancy score; and wherein performing the relevancy process includes defining the relevancy score by utilizing the relevancy prediction information and by utilizing at least one of bids from relevant advertisers, geographic location of the remote computer, an inventory data list from at least one relevant advertiser, a desirability factor from at least one of the relevant advertisers to distance a desirable matched keyword from at least one undesirable matched keyword, and weights from a data list.

12. The computer-implemented method according to claim 11, further comprising excluding matched keywords based upon a relatively low relevancy score.

13. The computer-implemented method according to claim 10, wherein the relevancy prediction information comprises at least one of user time of session, date of session, geographic location, device class, search frequency, historical performance, keyword match type, keyword class, publisher class, publisher ID, keyword ID, Adgroup ID, Adcopy ID, partial query length, partial query to keyword levenshtein distance, partial query to keyword Jaro similarity, organic ranking, publisher ID Click-Through Rate (CTR), publisher class CTR, keyword class CTR, keyword ID CTR, Adgroup ID CTR, Adcopy ID CTR, bid price, average order value (AOV), and conversion rate (CVR).

14. The computer-implemented method according to claim 9, further comprising changing the at least one top matched keyword and the at least one respective element based on a change to the partial query term.

15. The computer-implemented method according to claim 9, wherein the partial query term includes at least one of a document, a picture, an audio, a form of natural language, at least one word, and at least one character that is inputted into the search access point.

16. The computer-implemented method according to claim 9, wherein the search access point is associated with a search engine for the Internet; and wherein the method further comprises identifying words on social media websites used by a user of the search access point, with the search access point, to define social media keywords; and performing the relevancy process on the at least one matched keyword and the social media keywords to determine the at least one top matched keyword.

17. A matching unit for use in a computer-implemented system that includes a server in communication with a network and a database of keywords stored in the server, the matching unit configured to:
receive a partial query term inputted into a search access point associated with a search engine for the Internet, via the network; wherein the search engine is capable of identifying words on social media websites used by a user of the search access point to define social media keywords;
match the partial query term to the database of keywords to define at least one matched keyword;
perform a relevancy process on the at least one matched keyword and the social media keywords to define a relevancy score;
determine at least one top matched keyword based on the least one matched keyword and the social media keywords by utilizing the relevancy score; and
send the at least one top matched keyword and at least one respective element associated with the at least one top matched keyword, to be displayed adjacent the search access point;
change the at least one top matched keyword and the at least one respective element based on a change to the partial query term;
wherein the at least one respective element further includes at least one of an image, impression pixel, ad copy, ad term, product price, geographical indicator, click URL, image URL, impression URL, brand flag, brand domain, and a listing identifier.

18. The matching unit according to claim 17, wherein the relevancy process is performed on the at least one matched keyword to define the relevancy score based on relevancy prediction information that comprises at least one of user time of session, date of session, geographic location, device class, search frequency, historical performance, keyword match type, keyword class, publisher class, publisher ID, keyword ID, Adgroup ID, Adcopy ID, partial query length, partial query to keyword levenshtein distance, partial query to keyword Jaro similarity, organic ranking, publisher ID Click-Through Rate (CTR), publisher class CTR, keyword class CTR, keyword ID CTR, Adgroup ID CTR, Adcopy ID CTR, bid price, average order value (AOV), and conversion rate (CVR).

19. The matching unit according to claim 17, wherein the relevancy process is performed on the at least one matched keyword to define the relevancy score based on at least one of relevancy prediction information, a predefined keyword relevancy ranking, and a Key Performance Indicator (KPI); wherein the relevancy prediction information comprises at least one of bids from relevant advertisers, geographic location of the remote computer, an inventory data list from at least one relevant advertiser, a desirability factor from at least one of the relevant advertisers to distance a desirable matched keyword from at least one undesirable matched keyword, and weights from a data list.

20. The matching unit according to claim 17, wherein the partial query term includes at least one of a document, a picture, an audio, a form of natural language, at least one word, and at least one character that is inputted into the search access point.

* * * * *